US010065555B2

(12) United States Patent
Abrams et al.

(10) Patent No.: US 10,065,555 B2
(45) Date of Patent: Sep. 4, 2018

(54) DIRECTIONAL APPROACH LIGHTING

(71) Applicant: Ford Global Technologies, LLC, Dearborn, MI (US)

(72) Inventors: Nathan Jamar Abrams, Detroit, MI (US); David Randolph Roberts, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/259,511

(22) Filed: Sep. 8, 2016

(65) Prior Publication Data

US 2018/0065537 A1   Mar. 8, 2018

(51) Int. Cl.
*B60Q 1/00* (2006.01)
*B60Q 1/24* (2006.01)
*B60Q 1/26* (2006.01)
*H05B 37/02* (2006.01)

(52) U.S. Cl.
CPC ............. *B60Q 1/0023* (2013.01); *B60Q 1/24* (2013.01); *B60Q 1/2669* (2013.01); *H05B 37/0227* (2013.01); *H05B 37/0272* (2013.01)

(58) Field of Classification Search
CPC ........ B60Q 1/2665; B60Q 1/24; B60Q 1/323; B60Q 1/0023; B60Q 1/32; B60Q 2400/40; B60Q 2400/50; G03B 21/206; G03B 29/00; B60R 1/12; B60R 1/1207; B60R 21/12; B60R 2001/1284; H05B 37/0227; H05B 37/02

USPC .......... 353/13; 315/307, 158, 312; 362/494, 362/542, 540

See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,709,453 A | 1/1998 | Krent et al. |
| 5,839,718 A | 11/1998 | Hase et al. |
| 6,117,362 A | 9/2000 | Yen et al. |
| 6,260,988 B1 | 7/2001 | Misawa et al. |
| 6,419,854 B1 | 7/2002 | Yocom et al. |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |

(Continued)

FOREIGN PATENT DOCUMENTS

CN   101337492 A   1/2009
CN   201169230 Y   2/2009
(Continued)

*Primary Examiner* — Haissa Philogene
(74) *Attorney, Agent, or Firm* — Jason Rogers; Price Heneveld LLP

(57) ABSTRACT

A lighting system of a vehicle is provided herein. A projector is coupled to a side structure of the vehicle. A sensor detects a remote device carried on a person approaching the vehicle. Based on a detected location of the remote device relative to the vehicle, the projector projects a light pattern onto a ground surface to define an illuminated path leading up to the vehicle and pointing towards the person.

17 Claims, 3 Drawing Sheets

(56) References Cited

U.S. PATENT DOCUMENTS

| | | |
|---|---|---|
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,354,182 B2 | 4/2008 | Bartels |
| 7,377,675 B2 * | 5/2008 | Pastrick ............... B60Q 1/2665 359/841 |
| 7,441,914 B2 | 10/2008 | Palmer et al. |
| 7,458,698 B2 | 12/2008 | Heathcock et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,764,256 B2 | 7/2014 | Foote et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,937,454 B2 | 1/2015 | Baarman et al. |
| 8,952,341 B2 | 2/2015 | Kingsley et al. |
| 8,963,705 B2 | 2/2015 | Miller et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,150,423 B2 | 10/2015 | Choi |
| 9,194,168 B1 | 11/2015 | Lu et al. |
| 9,299,887 B2 | 3/2016 | Lowenthal et al. |
| 9,321,395 B2 * | 4/2016 | Ammar .................. B60R 1/12 |
| 9,442,888 B2 | 9/2016 | Stanfield et al. |
| 9,579,987 B2 | 2/2017 | Penilla et al. |
| 9,604,568 B1 * | 3/2017 | Salter .................. B60Q 1/323 |
| 2002/0159741 A1 | 10/2002 | Graves et al. |
| 2002/0163792 A1 | 11/2002 | Formosa |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2011/0115375 A1 | 5/2011 | Shiratsuchi et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Galley et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0288832 A1 | 9/2014 | Hoch et al. |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0214535 A1 | 7/2016 | Penilla et al. |
| 2016/0236613 A1 | 8/2016 | Trier |
| 2017/0050558 A1 * | 2/2017 | Salter ..................... B60R 1/12 |
| 2017/0066380 A1 * | 3/2017 | Shah .................. B60Q 1/2665 |
| 2017/0213165 A1 | 7/2017 | Stauffer et al. |

FOREIGN PATENT DOCUMENTS

| | | |
|---|---|---|
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2002211311 A | 7/2002 |
| JP | 2007145141 A | 6/2007 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2012157934 A2 | 11/2012 |
| WO | 2014068440 A1 | 5/2014 |

* cited by examiner

DIRECTIONAL APPROACH LIGHTING

FIELD OF THE INVENTION

The present invention generally relates to vehicle lighting systems, and more particularly, to approach lighting.

BACKGROUND OF THE INVENTION

Many current vehicles offer approach lighting such as puddle lamps, which typically illuminate a ground area near the vehicle. However, these and other lighting solutions are generally static and may be perceived as being dull in appearance. Accordingly, there is a need for an approach lighting solution that is dynamic and imparts a stylistic element to a vehicle.

SUMMARY OF THE INVENTION

According to one aspect of the present invention, a lighting system of a vehicle is provided. A projector is coupled to a side structure of the vehicle. A sensor detects a remote device carried on a person approaching the vehicle. Based on a detected location of the remote device relative to the vehicle, the projector projects a light pattern onto a ground surface to define an illuminated path leading up to the vehicle and pointing towards the person.

According to another aspect of the present invention, a lighting system of a vehicle is provided. A projector is coupled to a door of the vehicle. A sensor detects a remote device carried on a person. The projector projects a light pattern onto a ground surface to define an illuminated path leading up to the door and is operable to shift the light pattern such that the illuminated path is aligned with a direction in which the person approaches the vehicle.

According to yet another aspect of the present invention, a lighting method for a vehicle is provided. The method includes the steps of: comprising the steps of providing a projector coupled to a door of the vehicle; using a sensor to detect a location of a remote device relative to the vehicle; and activating the projector to project a light pattern onto a ground surface to define an illuminated path leading up to the door and pointing towards a person approaching the vehicle and carrying the detected remote device.

These and other aspects, objects, and features of the present invention will be understood and appreciated by those skilled in the art upon studying the following specification, claims, and appended drawings.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
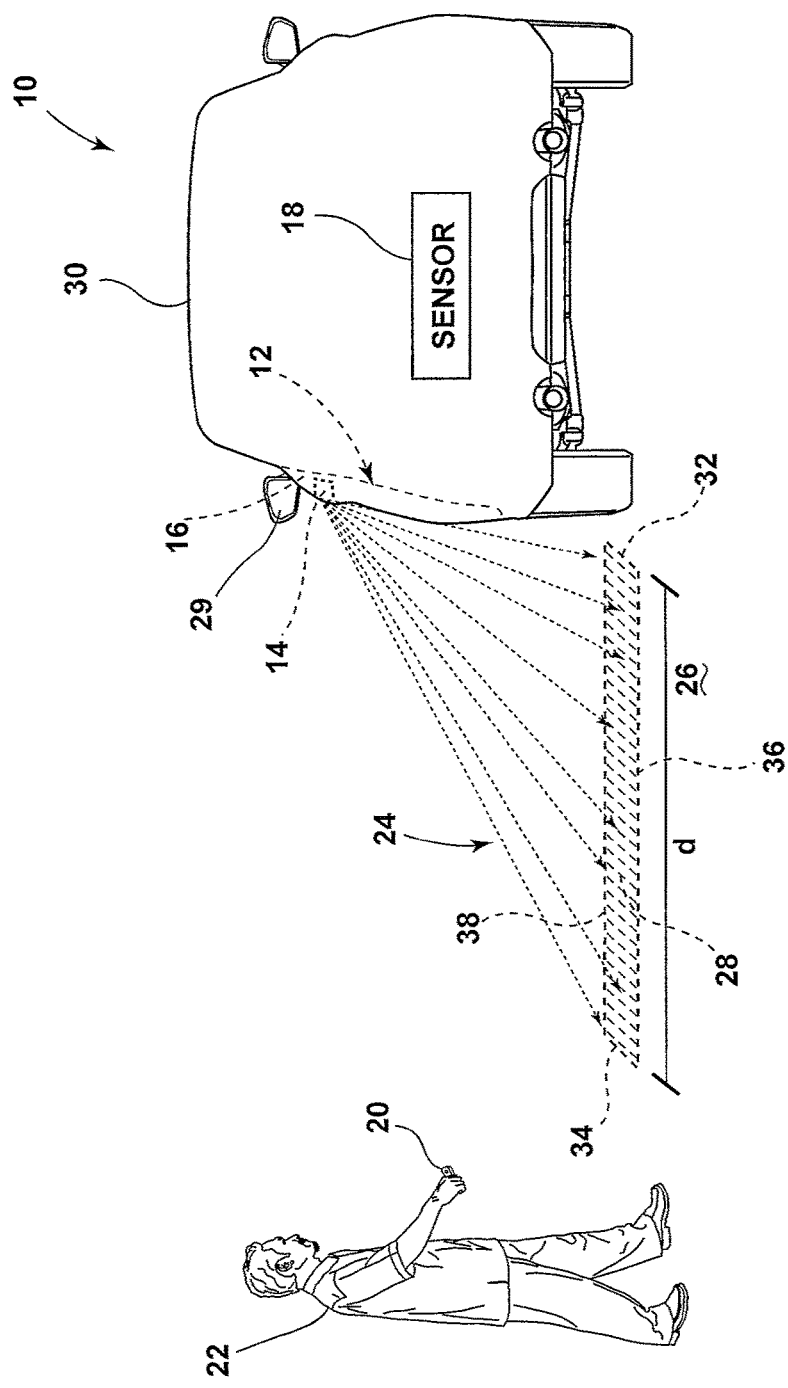
FIG. 1 is a rear view of a vehicle equipped with a lighting system that projects a light pattern onto a ground surface.

Referring to FIG. 1, a vehicle 10 is shown having a lighting system 12. The lighting system 12 includes a projector 14 coupled to a side structure shown as door 16 of the vehicle 10 and a sensor 18 on-board the vehicle 10 for detecting a remote device 20 carried on a person 22. Based on a detected location of the remote device 20 relative to the vehicle 10, the projector 14 projects a light pattern 24 onto a ground surface 26 to define a substantially straight illuminated path 28 leading up to the door 10 and pointing towards the person 22. In the depicted embodiment of FIG. 1, the door 16 corresponds to a front driver side door and the projector 14 may be variously coupled thereto. For example, the projector 14 may be mounted to an exterior portion of the door 16 or otherwise integrated therein and draws power from an on-board vehicle supply or independent power source. In embodiments where the projector 14 is integrated into the door 16, the door 16 is configured so as not to block the light pattern 24 projected from the projector 14. The projector 14 may be variously located on or inside the door 16 and is exemplarily shown in FIG. 1 to be centrally located within the door 16. However, it is contemplated that the projector 14 may be coupled to other vehicle structures such as, but not limited to, a side mirror 29 and a roof 30 of the vehicle 10.

In the depicted embodiment, the light pattern 24 may be expressed in any desired color or colors and is generally represented by exemplary light rays stemming from the projector 14 and includes a lower extent projected substantially downwardly toward the ground surface 26 to define a proximal end 32 of the illuminated path 28 and an upper extent projected downwardly toward the ground surface 26 and away from the door 16 to define a distal end 34 of the illuminated path 28. The light pattern 24 also includes side extents projected downwardly toward the ground surface 26 and away from the door 16 to define sides 36 and 38 of the illuminated path 28. As shown, the proximal end 32 is directly adjacent to the vehicle 10 and connects to the distal end 34 via sides 36 and 38. The proximal and distal ends 32, 34 are separated by a distance d, which may be a fixed predetermined distance selected based on the projection capabilities of the projector 14. In one embodiment, the light pattern 24 is projected in a red color such that the illuminated path 28 simulates a "red carpet" effect for the person 22 approaching the vehicle 10. In another embodiment, it is contemplated that the light pattern 24 may define an image such as an icon, logo, or other source identifier associated with the manufacturer of the vehicle 10. While the illuminated path 28 has been described as having an elongated rectangular shape, it will be understood that the light pattern 24 may differ in alternative embodiments such that the illuminated path 28 is expressed in a different shape such as, but not limited to, an oval, circle, square, triangle, and variations thereof.

Figure 2:
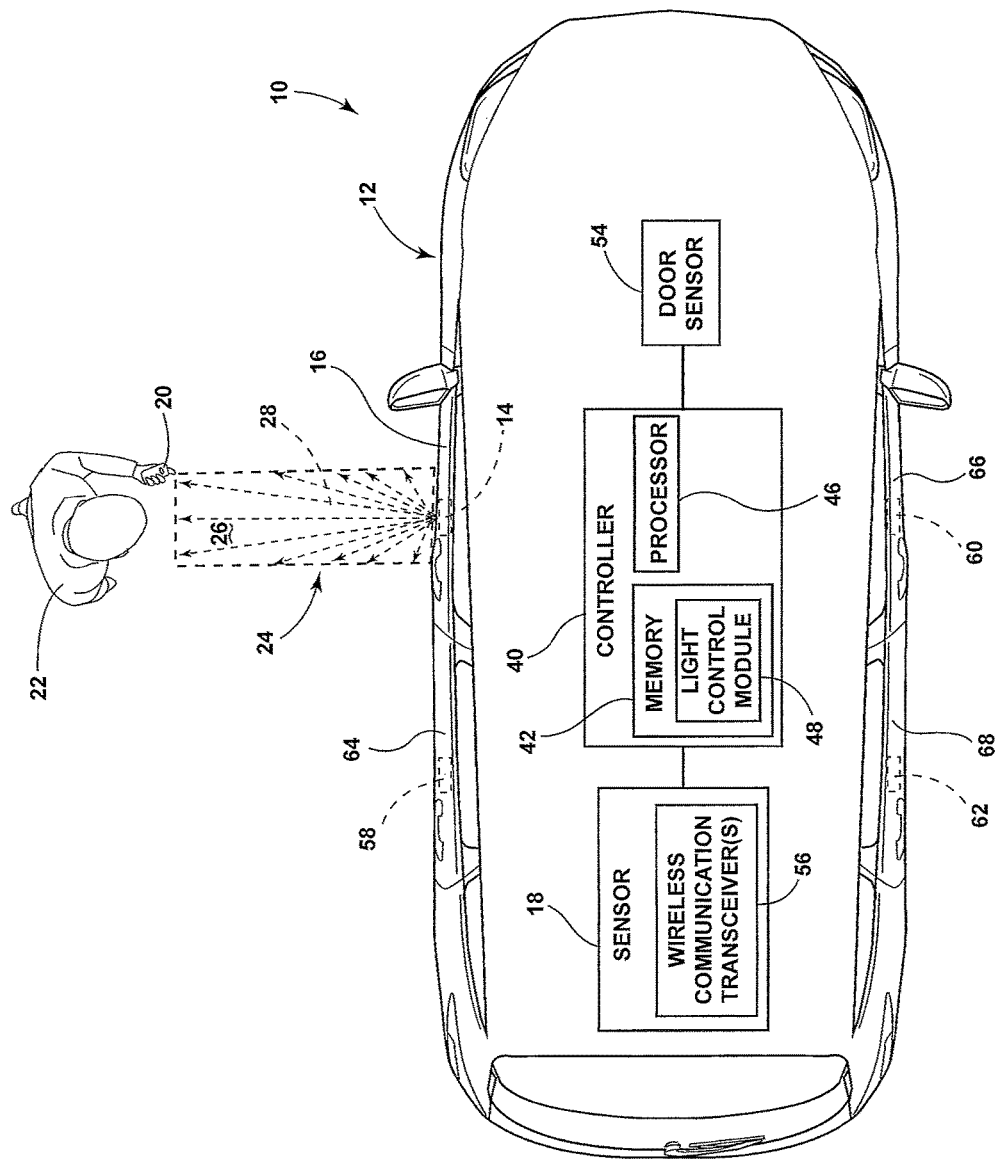
FIG. 2 is a top view of the vehicle and light pattern shown in FIG. 1.

Referring to FIG. 2, the lighting system 12 includes a controller 40 operably coupled to the projector 14 and configured to control an operational state thereof. The controller 40 may be a dedicated controller or may be shared with other vehicle equipment. The controller 40 includes a memory 42 having one or more routines stored thereon that are executable by a processor 46. For example, the memory 42 may store a light control routine 48 that is executable by the processor 46 to control the operational state of the projector 14. The operation of the projector 14 may be based on information provided to the controller 40 from the sensor 18. For example, in response to the sensor 18 detecting the presence of the remote device 20, the controller 40 activates the projector 14 to project the light pattern 24 onto the ground surface 26 such that the illuminated path 28 leads up to the door 16 and points towards the person 22 carrying the remote device 20. Accordingly, as the person 22 carrying the remote device 20 moves relative to the vehicle 10, the direction in which the projector 14 projects the light pattern 24 may shift based on a change in the detected location of the remote device 20 so as to ensure that the illuminated path 28 consistently points towards the person 22 carrying the remote device 20. In operation, the projector 14 generally remains activated to project the light pattern 24 onto the ground surface 26 so long as the remote device 20 is detected. In one embodiment, the controller 40 deactivates the projector 14 if the remote device 20 is detected in close proximity (e.g., 1 foot) to the vehicle 10 or the person 22 opens the door 16. In the latter instance, the controller 40 may receive input from a door sensor 54 indicating that the door 16 has been opened and subsequently deactivate the projector 14.

With further continued reference to FIG. 2, the sensor 18 includes one or more wireless communication transceiver 56 configured to interact with the remote device 20 over a wireless signal (e.g., radio frequency). In a specific example, the wireless communication transceiver(s) 56 may be a Bluetooth™ RN4020 module or an RN4020 Bluetooth™ low energy PICtail board configured to communicate with the remote device 20 using Bluetooth™ low energy signals. The wireless communication transceiver(s) 56 may include a transmitter and a receiver to transmit and receive wireless signals (e.g., Bluetooth™ signals) to and from the remote device 20. It will be appreciated that the wireless communication transceiver(s) 56 may utilize other forms of wireless communication with the remote device 20 such as Wi-Fi™. The wireless communication transceiver(s) 56 may be positioned on or within the controller 40 or be located elsewhere on the vehicle 10.

The controller 40 and/or the remote device 20 may include one or more routines which control the communication between the wireless communication transceiver(s) 56 and the remote device 20. For example, instructions for controlling the communication between the wireless communication transceiver(s) 56 and the remote device 20 may be included in the light control routines 48 and executed by the processor 46 of the controller 40. In operation, the remote device 20 may communicate with all, some, or none of the wireless communication transceiver(s) 56 as the remote device 20 enters and exits the communication range of the wireless communication transceiver(s) 56. The wireless communication transceiver(s) 56 may be aware of its location within the vehicle 10 and is capable of sharing its location with the remote device 20. In various embodiments, the wireless communication transceiver(s) 56 are capable of communicating with the remote device 20 such that the location of the remote device 20 may be determined therefrom (e.g., based on signal strength and/or return time of the signal) or vice versa.

According to one embodiment, the controller 40 may utilize the signal strength and time to return of the signals between the wireless communication transceiver(s) 56 and the remote device 20 to triangulate the position of the remote device 20 as the person 22 carrying it is approaching or leaving the vehicle 10. In response, the controller 40 may operate the projector 14 to project the light pattern 24 onto the ground surface 26 such that the illuminated path 28 points in the general direction of the person 22 carrying the remote device 20. It is contemplated that the remote device 20 may be a portable electronic device such as a smartphone, tablet, and the like. In alternative embodiments, the remote device 20 may correspond to a passive anti-theft system (PATS) key. As is known PATS keys typically have a radio frequency transponder with a unique electronic identification code. Accordingly, in embodiments where the remote device 20 is a PATS key, the controller 40 may be configured to activate the projector 14 only in instances when the electronic identification code of the key is detected by the wireless communication transceiver(s) 56.

In embodiments where the remote device 20 is a portable electronic device such as a smartphone, choosing whether the remote device 20 should be trusted and therefore given access to communicate with the wireless communication transceiver(s) 56 may be determined based on whether the remote device 20 has been inside of the vehicle 10 before. According to one embodiment, the memory 42 of the controller 40 may store identifying information relating to the remote device 20 if detected within the vehicle 10 and may subsequently designate the remote device 20 as "friendly." In determining whether the remote device 20 is friendly, the wireless communication transceiver(s) 56 detect the presence of the remote device 20, detect a characteristic signal shift (e.g., attenuation or increase in signal at the wireless communication transceiver(s) 56) indicative of the remote device 20 entering or being within the vehicle 10 across the wireless communication transceiver(s) 56, and store characteristic information about the remote device 20 for future identification.

It will be understood that a determination of the location of the remote device 20 to be within the vehicle 10 may also prompt a storing of the characteristic information on the remote device 20 for future identification. Utilizing the past and/or present location of the remote device 20 as a security feature to determine if it is allowed access to the wireless communication transceiver(s) 56 may be particularly advantageous as the replication of signal shifting indicative of the remote device 20 entering the vehicle 10 and the location of the remote device 20 is particularly difficult to fake. Further, it will be understood that more conventional methods of connecting portable electronic devices such as pairing and manually connecting may also be utilized to designate the remote device 20 as being friendly.

With further reference to FIG. 2, the lighting system 12 may include additional projectors 58, 60, 62, each coupled to a respective door 64, 66, 68 of the vehicle 10 and operated similarly to projector 14. For example, the projectors 58, 60, 62 may each be operably coupled to the controller 40 and independently operated based on the detected location of the remote device 20 relative to the vehicle 10. Thus, it is to be understood that one or more of the projectors 14, 58, 60, 62 may be activated upon detection of the remote device 20 or multiple friendly remote devices.

Figure 3:
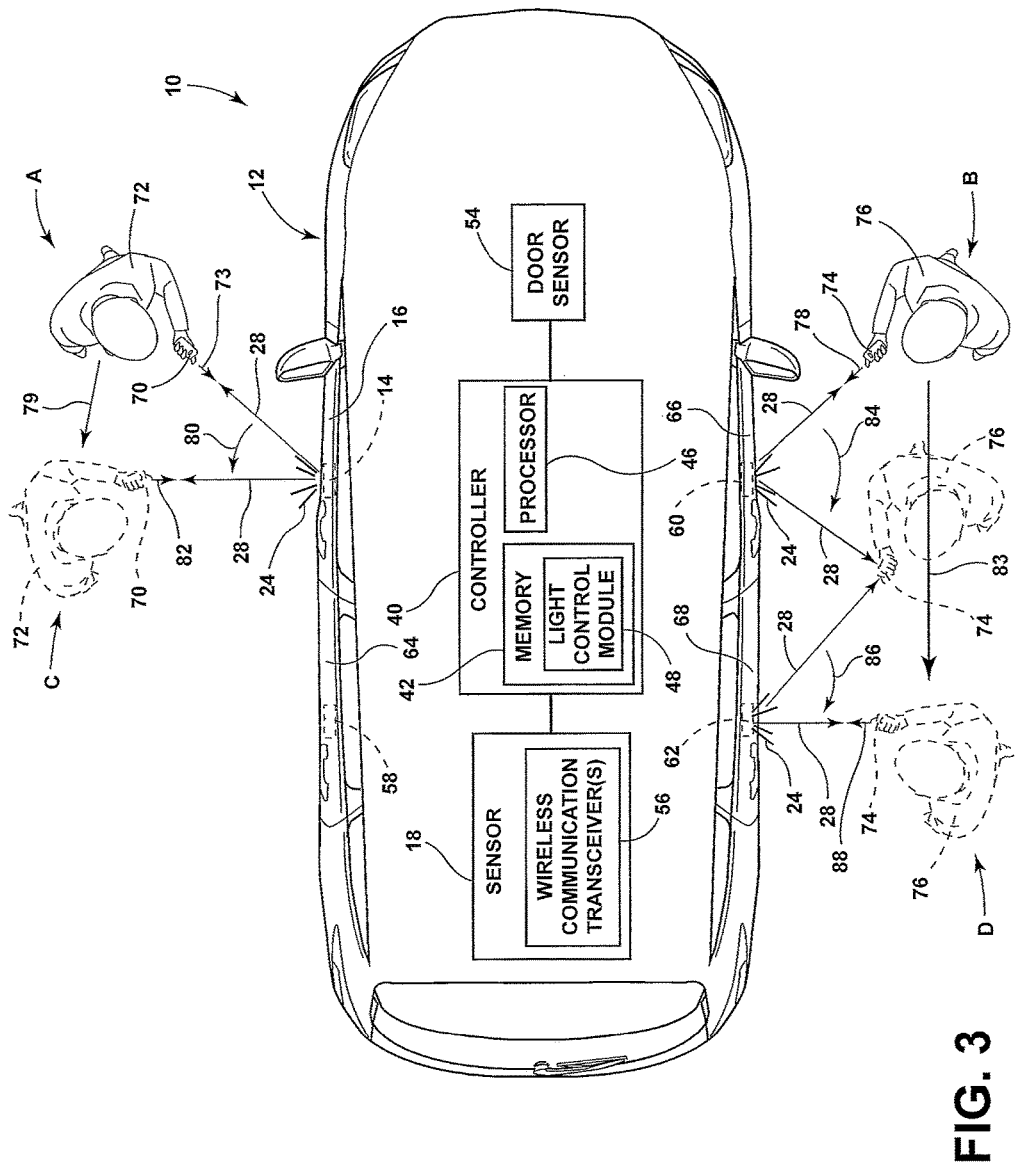
FIG. 3 is another top view of the vehicle illustrating multiple light patterns being projected on the ground surface.

In one exemplary scenario, depicted in FIG. 3, the wireless communication transceiver(s) 56 detects a first friendly remote device 70 being carried by a person 72 at position A and approaching door 16 of the vehicle 10 in the direction specified by arrow 73. The wireless communication transceiver(s) 56 also detect a second friendly remote device 74 being carried by another person 76 at position B and approaching door 66 of the vehicle 10 in the direction specified by arrow 78. The currently detected locations A, B of the first and second friendly remote devices 70, 74 are provided to the controller 40 by the wireless communication transceiver(s) 56. By virtue of the first friendly remote device 70 being detected closest to door 16, the controller 40 activates projector 14 to project the light pattern 24 onto the ground surface 26 such that the corresponding illuminated path 28 leads up to door 16 and points towards the person 72 carrying the first friendly remote device 70. Likewise, by virtue of the second friendly remote device 74 being detected closest to door 66, the controller 40 activates projector 60 to project the light pattern 24 onto the ground surface 26 such that the corresponding illuminated path 28 leads up to door 66 and points towards the person 76 carrying the second friendly remote device 74. Should the approach direction of either person 72, 76 change, the controller 40 may operate the appropriate projector 14, 60 to shift the light pattern 24 accordingly based on the detected location of the first and/or second friend remote device 70, 74. For purposes of clarity and explanation, the illuminated paths 28 are shown in FIG. 3 as directional arrows.

For example, with continued reference to FIG. 3, if the person 72 carrying the first friendly remote device 70 moves from position A to position C in the direction specified by arrow 79, the controller 40 operates projector 14 to shift the light pattern 24 in the direction specified by arrow 80 such that the corresponding illuminated path 28 keeps in alignment with the changing approach direction as the person 72 carrying the first friendly remote device 70 progresses towards position C. In this manner, once the person 72 reaches position C, the illuminated path 28 will have shifted accordingly such that it is aligned with the final approach direction (e.g., direction arrow 82) of the person 72 carrying the first friendly remote device 70. Similarly, if the person 76 carrying the second friend remote device 74 moves from position B to position D in the direction specified by arrow 83, the controller 40 may operate projector 60 to shift the light pattern 24 in the direction specified by arrow 84 such that the corresponding illuminated path 28 keeps in alignment with the changing approach direction as the person 76 carrying the second friendly remote device 74 progresses towards position D. However, once the second friendly remote device 74 is detected as being closer to door 68 of the vehicle 10, the controller 40 may deactivate projector 60 and activate projector 62 to project and shift its light pattern 24 in the direction specified by arrow 86 such that the corresponding illuminated path 28 keeps in alignment with the changing approach direction as the person nears position D. In this manner, once the person 76 reaches position D, the illuminated path 28 associated with projector 62 will have shifted accordingly such that it is aligned with the final approach direction (e.g., direction arrow 88) of the person 76 carrying the second friendly remote device 74. Thus, through constant detection of the relative position of one or more friendly remote devices, the appropriate projector(s) may be activated and made to project and shift (if necessary) its light pattern 24 in a manner that keeps the corresponding illuminated path 28 in alignment with the current approach direction of the person carrying the friendly remote device. With respect to the disclosure provided herein, it is to be understood that the projector(s) may include any conventional light projector capable of projecting and shifting a fixed or variable light pattern.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A lighting system of a vehicle, comprising:
   a plurality of projectors each coupled to an associated side structure of the vehicle; and
   a sensor for detecting a remote device carried on a person approaching the vehicle;
   wherein based on a detected location of the remote device relative to the vehicle, the plurality of projectors are selectively operable to project a light pattern onto a ground surface to define an illuminated path leading up to the vehicle and pointing towards the person.

2. The lighting system of claim 1, wherein the illuminated path is substantially straight.

3. The lighting system of claim 2, wherein the plurality of projectors are selectively operable to shift the projected light pattern based on a change in the detected location of the remote device.

4. The lighting system of claim 1, wherein the sensor comprises one or more wireless communication transceivers configured to interact with the remote device over a wireless signal.

5. The lighting system of claim 4, wherein the remote device comprises one of a portable electronic device and a passive anti-theft system (PATS) key.

6. The lighting system of claim 1, wherein the associated side structure comprises a door of the vehicle.

7. A lighting system of a vehicle, comprising:
   a plurality of projectors each coupled to a uniquely associated door of the vehicle; and
   a sensor for detecting a remote device carried on a person;
   wherein based on the detected location of the remote device, the plurality of projectors are selectively operable to project a light pattern onto a ground surface to define an illuminated path leading up to a door of the vehicle and are selectively operable to shift the light pattern such that the illuminated path is aligned with a direction in which the person approaches the vehicle.

8. The lighting system of claim 7, wherein the controller activates whichever projector is associated with the door in closest proximity to the detected remote device.

9. The lighting system of claim 7, wherein the illuminated path substantially straight.

10. The lighting system of claim 7, wherein the sensor comprises one or more wireless communication transceivers configured to interact with the remote device over a wireless signal.

11. The lighting system of claim 10, wherein the remote device comprises one of a portable electronic device and a passive anti-theft system (PATS) key.

12. The lighting system of claim 7, further comprising a controller communicatively coupled to the sensor and configured to selectively operate the plurality of projectors.

13. A lighting method for a vehicle, comprising the steps of:
   providing a plurality of projectors each coupled to a uniquely associated door of the vehicle;
   using a sensor to detect a location of a remote device relative to the vehicle; and
   based on the detected location of the remote device, selectively activating the plurality of projectors to project a light pattern onto a ground surface to define an illuminated path leading up to the door and pointing towards a person approaching the vehicle and carrying the detected remote device.

14. The lighting method of claim 13, wherein the sensor comprises one or more wireless communication transceivers configured to interact with the remote device over a wireless signal.

15. The lighting method of claim 14, wherein the remote device comprises one of a portable electronic device and a passive anti-theft system (PATS) key.

16. The lighting method of claim 13, further comprising the step of selectively operating the plurality of projectors to shift the light pattern in response to a directional change in which the person carrying the remote device approaches the vehicle.

17. The lighting method of claim 13, wherein the illuminated path is substantially straight.

* * * * *